Jan. 4, 1938.   M. S. GONZALES   2,104,226
GYRO STABILIZER
Original Filed Jan. 26, 1934   3 Sheets-Sheet 1

INVENTOR
MIGUEL S. GONZALES
BY
Herbert H. Thompson
HIS ATTORNEY.

Jan. 4, 1938.    M. S. GONZALES    2,104,226
GYRO STABILIZER
Original Filed Jan. 26, 1934    3 Sheets-Sheet 2

INVENTOR
MIGUEL S. GONZALES
BY
Herbert H. Thompson
HIS ATTORNEY.

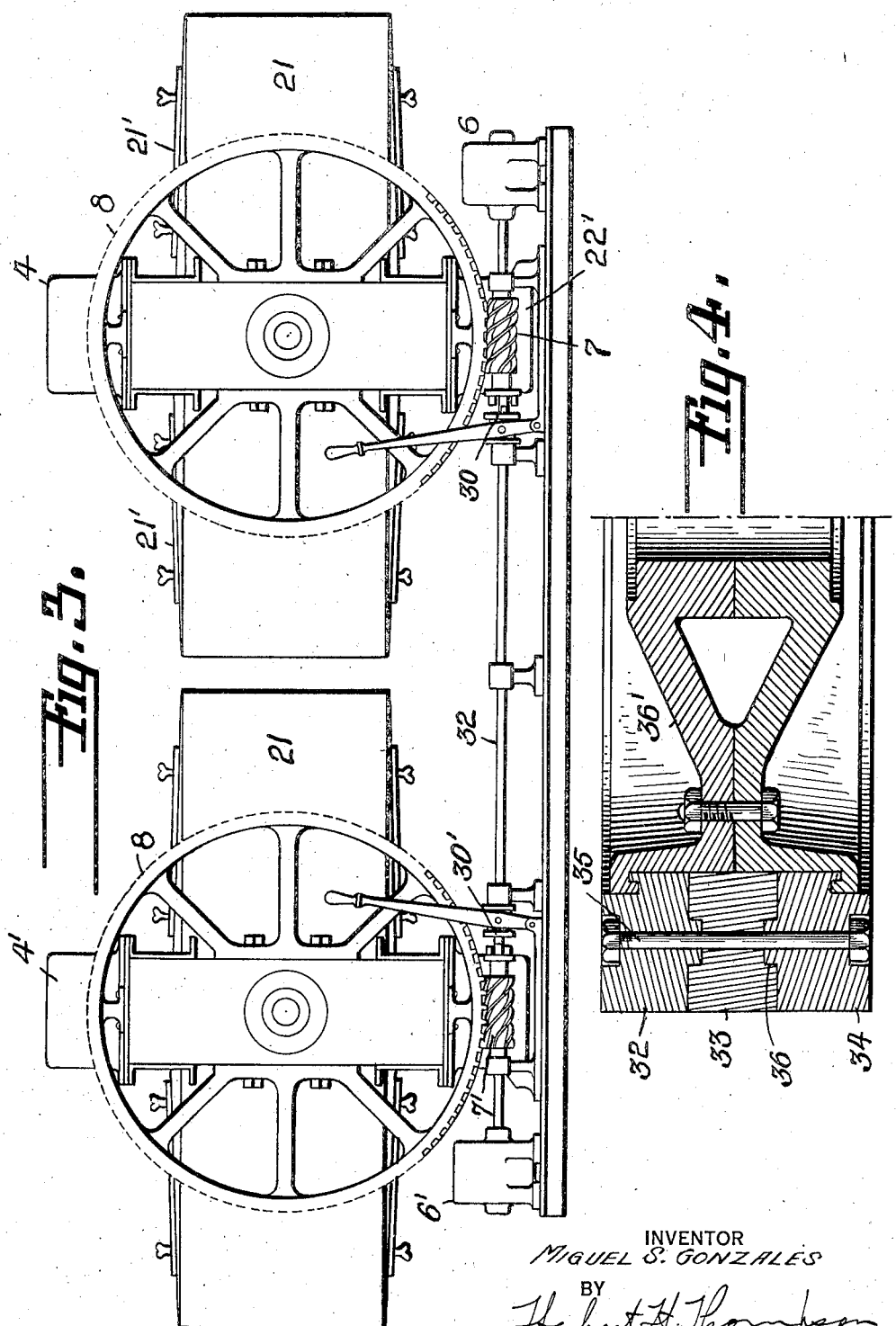

Patented Jan. 4, 1938

2,104,226

UNITED STATES PATENT OFFICE 2,104,226

GYRO STABILIZER

Miguel S. Gonzáles, Mexico D. F., Mexico

Application January 26, 1934, Serial No. 708,409. Renewed November 16, 1937. In Mexico January 25, 1933

1 Claim. (Cl. 74—5)

This invention refers to a gyro stabilizer of improved construction, different from those known by being provided with a hollow shaft for the stabilizer rotor, having more than one propulsion motor for the stabilizer rotor, having two sets of bearings each consisting of a radial and an axial bearing, having simplified the precession system to a worm wheel and worm, having fitted to the precession more than one propulsion motor, having the axles of the support of the drum of the stabilizer rotor hollow, having a panel on which temperatures of the bearings are registered, speeds of rotation of the stabilizer rotors and control, tension of the current supplied to its motors, total electricity absorbed by its motors, and electric control by means of switches; having a balance recorder, inclinometer, of the stabilizer rotor, which shows the inclination to which this stabilizer rotor leans, and having its structure formed of structural steel, all of which makes this apparatus a compact mechanism, light and efficient because of its double thrust bearing which make it reversible.

The invention also refers to a system of precession in series for two or more units; of a laminated rotor for changing its weight; and in addition of the transmission of the movement of rotation in the starting of the motors of the rotor, by means of a clutch.

The characteristic details of the machine show clearly the following description and in the drawings which accompany it, as an illustration of the same and using the same reference signs in order to indicate the same parts in the two figures shown.

Fig. 3 is a side elevation of a modified form of the invention, utilizing a plurality of gyro stabilizers connected in series.

Fig. 4 is a sectional detail of a modified form of built-up rotor.

Figure 1:
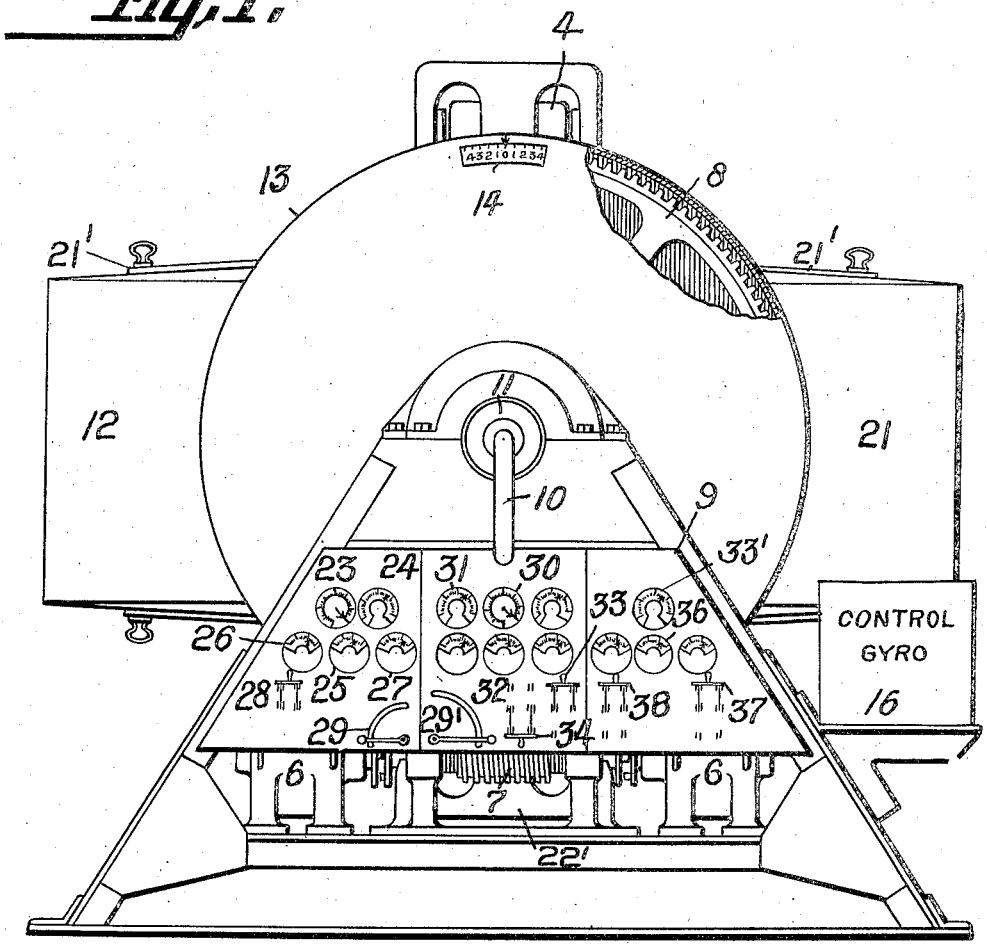
Fig. 1 is an elevation of the apparatus, in which my invention is incorporated.
Figure 2:
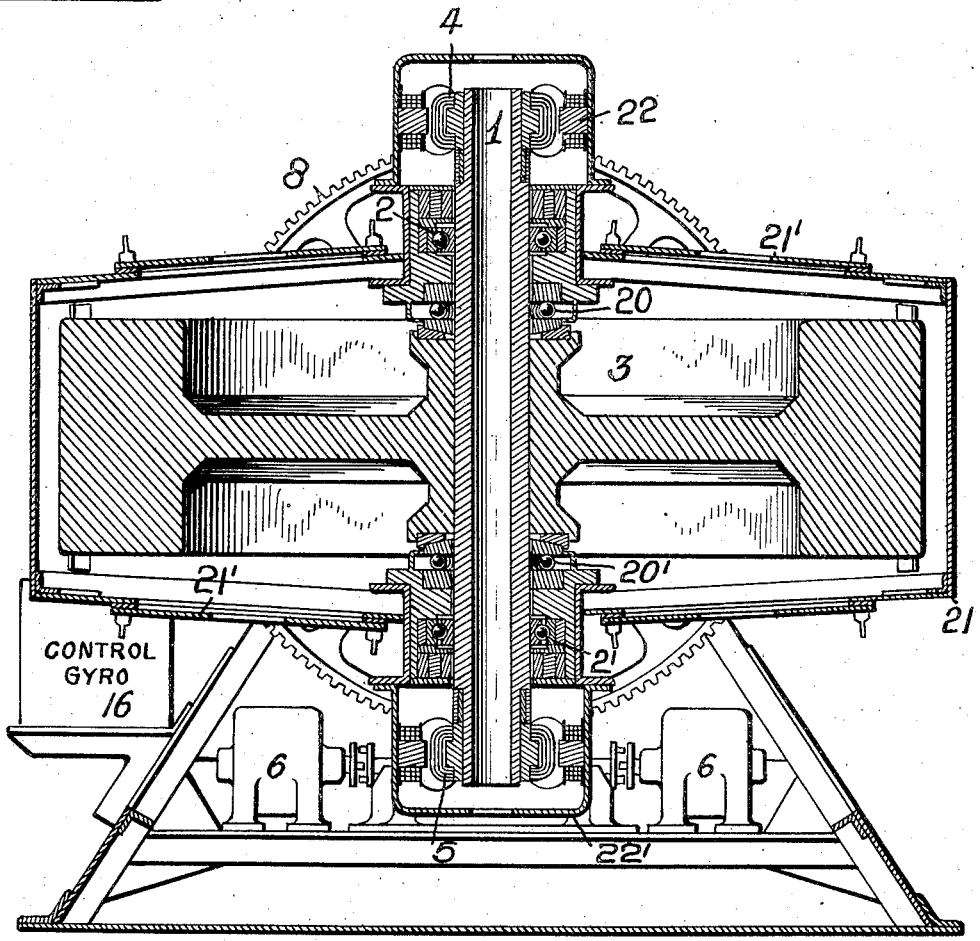
Fig. 2 is a vertical cross-section in which the stabilizer rotor, the two sets of bearings, the propulsion motors of the stabilizer rotor appear sectioned.

The apparatus, illustrated in the following drawings, comprises a stabilizer rotor with a hollow shaft 1, directly supported by the two combined radial and thrust bearings 2 and 2' and 20, 20' so that the gyroscope may be operated with either end up. The casing 21 or support of the stabilizer rotor 3 serves as a base for the inductors 22 of the propulsion motors 4, 5 the armatures of the propulsion motors being mounted on the shaft of the stabilizer rotor.

The precession system is comprised of precession motors 6, which impress movement on the worm 7, and this moves the worm wheel 8, which impresses precession movement to the gyroscope stabilizer.

The control panel 9 is divided into sections, one of them belonging to the control gyro 16 and on it is registered the speed of rotation of the control gyro rotor by dial 23, the temperature of its bearings by dial 24, the watts, amperes and voltage which its propulsion motor consumes by dials 25, 26 and 27 respectively, a switch 28 for supplying current to its propulsion motor, and the starting rheostat 29 for the same. Another of the sections is for the gyro stabilizer and on which are registered the speed of rotation of the stabilizer rotor at 30, the temperature of its bearings at 31, the current, volts and watts which is consumed by its propulsion motor at the dials 32, two double-throw switches 33 and 34 connected in series from end to center in order to eliminate both propulsion motors or one of them separately; and one starting rheostat 29'. The last section corresponds to the precession system and on which is registered the temperature of its bearings at 33', the electrical quantities which its propulsion motors consume at 36, two double-throw switches 37 and 38 connected in series from end to center in order to eliminate the two motors at once, or one of them separately.

The feed and register cables which go from the panel to the motors 4 and the bearings 2 pass through the conductor 10 to the interior of the drum 21 of the stabilizer rotor 3, through the hollow shaft or trunnion 11 of the support.

The cover 13 of the worm wheel 8 of the precession system has a window 14 with graduation by which the degrees of inclination of the stabilizer rotor can be seen.

The covers 21' of the drum 21 of stabilizer rotor have for the object to give open ventilation to the interior of the drum and to the stabilizer rotor.

The apparatus functions as follows: The stabilizer rotor 1 is put in motion by means of the motors 4 and 5, which function simultaneously in starting and only one for maintaining the required speed. The stabilizer rotor 3 can function indiscriminately with whatever of its ends in the lower position since the two thrust bearings make it reversible.

The precession system has for its object to give the stabilizer rotor an inclination which corresponds to the rolling which it is desired to counteract. The precession system is controlled through the control gyro 16 which closes and opens the circuit of the motors of the precession system which turns in one direction or another the worm producing the rolling of the stabilizer rotor to counteract the rolling which is desired.

The system of precession in series for two or more stabilizer units intends lengthening the common shaft 32 of the precession motors 6 and 6', and of the worms 7 and 7', in order to move synchronously the stabilizer units connected in this system (see Fig. 3).

The laminated rotor in order to change its weight may be formed with concentric discs 32, 33 and 34 which adapt and unite themselves by means of bolts 35 and locating pins or lugs 36 in order to form the rim of greater or smaller thickness.

The transmission of the movement of rotation in order to help in the starting of the motors of the rotor 4 is by means of a ratchet clutch, which catches in whatever of the ends of the rotor shaft 1 is adjacent thereto.

The system of precession in series for two or more stabilizers will be provided with clutches 30, 31 between the precession shaft 32 and the worms 7 and 7', for connecting or disconnecting these latter from the shaft when required.

The laminated rotor in order to change its weight will be formed with pieces 32 and 34 which will be added to the thickness of the rim 33 within the limits permitted by the section of the web 36' which unites the rim with the shaft.

The movement of rotation in order to help in the starting the motors of the rotor is impressed on the precession motors through a system of speed reduction or by another source of independent power.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

A gyro stabilizer comprising a plurality of gyroscopic units, a common shaft for precessing both of said units, a plurality of precession motors mounted on said shaft, gearing connecting each stabilizer with said shaft, and a clutch connecting each of said gears with said shaft, whereby one or more of said stabilizers may be disconnected from said shaft when desired.

MIGUEL S. GONZÁLES.